United States Patent
Franzi et al.

(10) Patent No.: US 11,050,872 B2
(45) Date of Patent: Jun. 29, 2021

(54) METHOD FOR BROADCASTING AN ALERT DESCRIPTIVE OF A NOTIFICATION MESSAGE

(71) Applicant: Tissot SA, Le Locle (CH)

(72) Inventors: Edoardo Franzi, Cheseaux-Noreaz (CH); Alain-Serge Porret, Neuchatel (CH)

(73) Assignee: Tissot SA, Le Locle (CH)

( * ) Notice: Subject to any disclaimer, the term of this patent is extended or adjusted under 35 U.S.C. 154(b) by 0 days.

(21) Appl. No.: 16/664,465

(22) Filed: Oct. 25, 2019

(65) Prior Publication Data
US 2020/0145523 A1    May 7, 2020

(30) Foreign Application Priority Data
Nov. 7, 2018    (EP) ..................... 18205004

(51) Int. Cl.
*H04M 1/725* (2021.01)
*H04M 1/72412* (2021.01)
(Continued)

(52) U.S. Cl.
CPC ........ *H04M 1/72412* (2021.01); *G04G 9/007* (2013.01); *G04G 21/08* (2013.01); *G08B 6/00* (2013.01); *H04B 1/385* (2013.01); *H04W 4/12* (2013.01); *H04W 8/183* (2013.01); *H04W 68/005* (2013.01)

(58) Field of Classification Search
CPC ..... H04W 4/12; H04W 8/183; H04W 68/005; H04M 1/7253; H04M 1/72412; H04M 1/72513; G04G 9/007; G04G 21/08; G08B 6/00; H04B 1/385
See application file for complete search history.

(56) References Cited

U.S. PATENT DOCUMENTS

| 8,712,383 | B1 | 4/2014 | Hayes et al. | |
| 2006/0226973 | A1* | 10/2006 | Catlin | G08B 17/10 340/539.11 |

(Continued)

FOREIGN PATENT DOCUMENTS

| CN | 105336204 A | 2/2016 |
| DE | 202013010965 U1 | 6/2014 |

(Continued)

OTHER PUBLICATIONS

Communication dated Apr. 18, 2019, issued by the European Patent Office in counterpart Application No. 18205004.7.

(Continued)

*Primary Examiner* — Wayne H Cai
(74) *Attorney, Agent, or Firm* — Sughrue Mion, PLLC

(57) ABSTRACT

A method for broadcasting an alert descriptive of a notification message to a wearer of a watch (1), the method comprising the following steps: reception (10) by a processing unit (2) of the watch (1) of data of information comprising a notification message relative to the identification of an event relating to a function of the watch (1), and sending (14) of a descriptive-alert signal relative to said received data of information to a touch-rendering interface (3) of the watch (1), said interface (3) being configured to transmit said descriptive alert to the wearer of the watch (1).

11 Claims, 1 Drawing Sheet

(51) Int. Cl.
*G04G 9/00* (2006.01)
*G04G 21/08* (2010.01)
*G08B 6/00* (2006.01)
*H04B 1/3827* (2015.01)
*H04W 4/12* (2009.01)
*H04W 8/18* (2009.01)
*H04W 68/00* (2009.01)

(56) References Cited

U.S. PATENT DOCUMENTS

| | | |
|---|---|---|
| 2015/0154853 A1 | 6/2015 | Yousef et al. |
| 2016/0119462 A1 | 4/2016 | Goldstein |
| 2019/0014075 A1* | 1/2019 | Swink .................. H04W 4/14 |
| 2019/0139515 A1* | 5/2019 | Inagaki ................ G06F 3/0412 |
| 2020/0137175 A1* | 4/2020 | Ganci, Jr. ............. H04L 67/36 |

FOREIGN PATENT DOCUMENTS

| | | |
|---|---|---|
| EP | 2 945 133 A1 | 11/2015 |
| JP | 2002-252676 A | 9/2002 |
| JP | 2007-215051 A | 8/2007 |
| JP | 2008-217731 A | 9/2008 |
| JP | 2014-239360 A | 12/2014 |
| JP | 2017-167054 A | 9/2017 |
| JP | 2018-109580 A | 7/2018 |
| WO | 2017/177409 A1 | 10/2017 |

OTHER PUBLICATIONS

Office Action dated Dec. 1, 2020 in Japanese Application No. 2019-201261.

* cited by examiner

METHOD FOR BROADCASTING AN ALERT DESCRIPTIVE OF A NOTIFICATION MESSAGE

CROSS-REFERENCE TO RELATED APPLICATION

This application claims the benefit of priority of European Patent Application No. 18205004.7 filed Nov. 7, 2018, the contents of which are incorporated herein by reference in their entirety.

TECHNICAL FIELD

The present invention relates to a method for broadcasting an alert descriptive of a notification message.

The invention also relates to a watch implementing this method as well as a computer program.

PRIOR ART

In the prior art, the reception of notification messages is conventionally signalled in watches by an alert consisting of the emission of a sound signal. However, such an emission of a sound signal alerting to the reception of these messages, can lead to discomfort for the wearer of the watch when it disturbs the silence reigning in places in which it is imperatively required.

To overcome this disadvantage, watches are known comprising a vibrating interface which thus emits vibrations as an alert, upon the reception of a notification message.

However, a major disadvantage of these watches is related to the fact that the wearer cannot determine the nature of the notification message solely on the basis of the vibrations of the vibrating interface, for this the wearer is systematically forced to view the dial of their watch on which the contents of this notification message are thus visible.

It is understood that there is thus a need to find an alternative solution, in particular which does not have the disadvantages of the prior art.

SUMMARY OF THE INVENTION

One goal of the present invention is therefore to propose a method for broadcasting an alert descriptive of a notification message allowing the wearer of the watch to determine the nature and the contents of this notification message from the alert emitted by this watch.

For this purpose, the invention relates to a method for broadcasting an alert descriptive of a notification message to a wearer of a watch, the method comprising the following steps:
 reception by a processing unit of the watch of data of information comprising a notification message relative to the identification of an event relating to a function of the watch, and
 sending of a descriptive-alert signal relative to said received data of information to a touch-rendering interface of the watch, said interface being configured to transmit said descriptive alert to the wearer of the watch;
In other embodiments:
 the method comprises a step of processing of said data of information comprising a substep of extraction of at least one descriptive characteristic of said data;
 the substep of extraction comprises a phase of selection of at least one descriptive characteristic in the data of information according to an extraction criterion;
 the extraction criterion is previously defined by the wearer of the watch and comprises namely the number and said at least one descriptive characteristic to be selected;
 the step of sending comprises a substep of selection of a criterion of design of the signal on the basis of said at least one descriptive characteristic extracted from the data of information;
 the design criterion comprises data on operation of the touch-rendering interface comprising at least one frequency and at least one amplitude defined for each vibrating element forming said interface;
 the data of information comprises a set of descriptive characteristics relative to the notification message;
 the signal comprises distinct control instructions of each vibrating element of the touch-rendering interface during the duration of broadcasting of the message.

The invention also relates to a watch that is in particular smart, implementing this method, comprising a processing unit and a touch-rendering interface provided with a plurality of vibrating elements, said processing unit being connected to said touch-rendering interface.

Advantageously, the touch-rendering interface is defined in all or just a portion of a part of the watch, said part being intended to be in contact with the skin of the wearer.

The invention also relates to a computer program comprising program code instructions for the execution of the steps of this method when said computer program is executed by a processing unit of a watch.

BRIEF DESCRIPTION OF THE DRAWINGS

Other particularities and advantages will be clear from the description thereof given below, for informational purposes and in no way limiting, in reference to the appended drawings, in which.

DETAILED DESCRIPTION OF THE INVENTION

Figure 1:
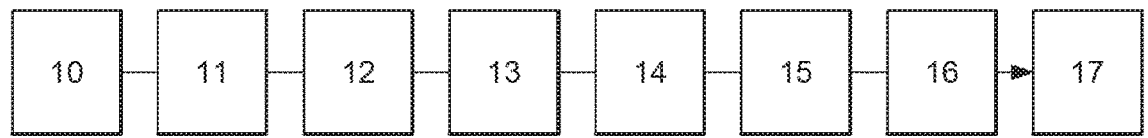
FIG. 1 shows a flowchart relating to a method for broadcasting an alert descriptive of a notification message, according to an embodiment of the invention.

FIG. 1 illustrates a method for broadcasting an alert descriptive of a notification message to a wearer of a watch 1. This method aims to notify/inform the wearer of the watch 1 of the identification of an event relative to one or more functions of the watch 1, via a broadcasting of a descriptive alert specific to the event identified. This alert is called descriptive because it is not limited only to signalling the reception of the notification message, but it also communicates the contents thereof by specifying the event identified to the wearer. Such an alert is also discrete and silent namely because it is broadcast without emission of a sound by a sound interface of this watch 1. It is noted that in this watch 1, the notification message comprises a content which thus relates to the identification of an event relating to a function of the watch, this can for example be a function relative to the monitoring of the heart rate of the wearer of the watch 1 and the event identified to the exceeding of a threshold by the measured heart rate of the wearer.

In this context, the alert descriptive of the notification message broadcast by the watch 1 to the wearer, namely via a touch-rendering interface 3, is a touch alert. Indeed, such an interface 3 allows the wearer to perceive the descriptive alert by touch. In other words, the reception of this alert by the wearer makes use of a touch sensory perception of the latter. In one example the wearer can perceive an alert on their skin corresponding to a sensation of a caress for an identified event relating to a missed call from their girlfriend or in an alternative, the wearer can perceive for this alert the realisation on their skin of a contour of the shape of a heart.

Figure 2:
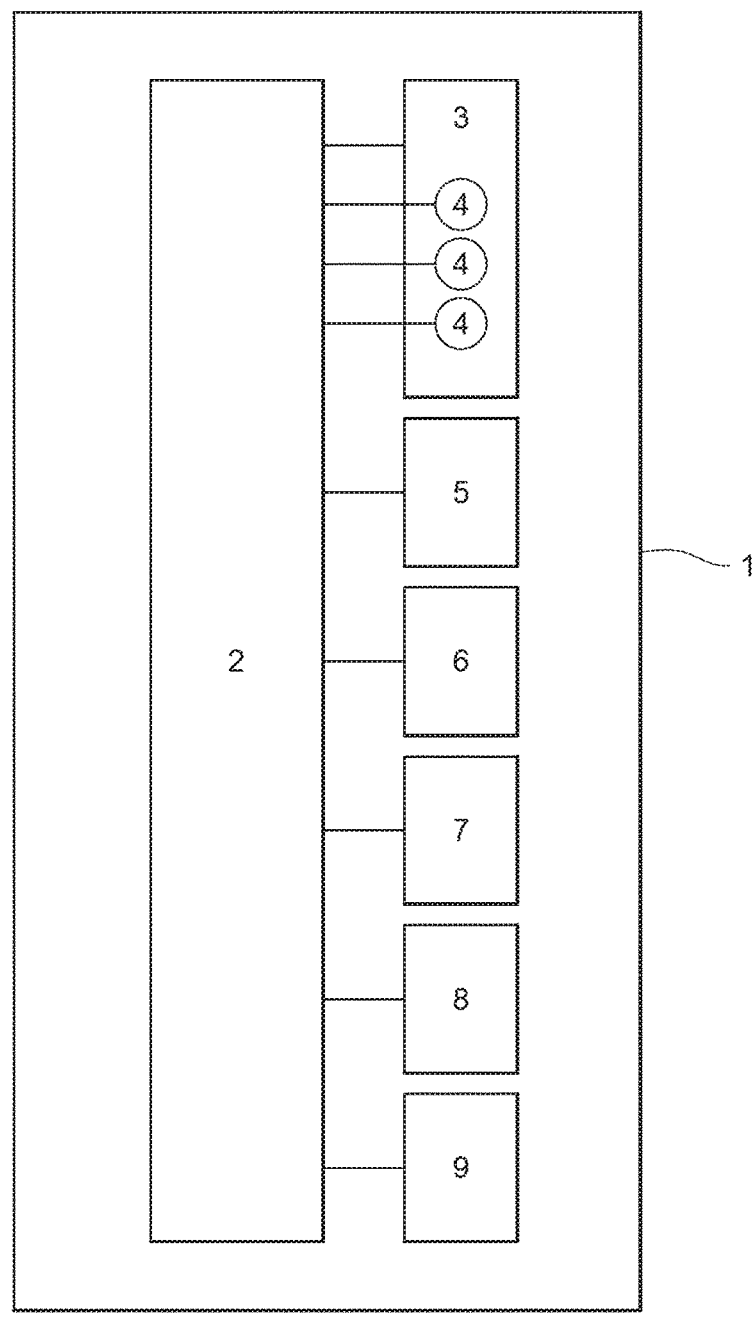
FIG. 2 shows a watch implementing this method, according to the embodiment of the invention.

Such a method is implemented by a watch 1 namely a smartwatch illustrated in FIG. 2. Such a watch 1 comprises in a non-exhaustive and non-limiting way:
- a processing unit 2 comprising physical and software resources in particular at least one processor cooperating with memory elements;
- the touch-rendering interface 3 comprising a plurality of vibrating elements 4 such as transducers capable of converting an electric signal into mechanical oscillations (for example: a plurality of piezoelectric elements;
- a hybrid display dial 5 provided with a first analogue display component and a second digital and/or alphanumeric display component;
- a sound interface 6 such as a speaker;
- a communication module 7;
- a mechanical or electronic movement 8, and
- environmental, behavioural and/or physiological sensors 9.

This processing unit 2 of the watch 1 is linked/connected inter alia to the sound interface 6, to the touch-rendering interface 3, to the vibrating elements 4, to the display dial 5, to the communication module 7, to the movement 8 and to the environmental, behavioural and/or physiological sensors 9.

In this watch 1, the touch-rendering interface 3 is defined in all or just a portion of a part of the watch 1, said part being intended to be in contact with the skin of the wearer for example that defined at their wrist. In other words, this touch-rendering interface 3 can be comprised in/on a face for contact with the skin of the bottom of the watch case and/or on/in a face for contact with this skin of the wristlet. In a first example of realisation, the vibrating elements 4 of this touch-rendering interface 3 can be arranged on all or a part of an inner face of the bottom of the watch case 1. In a second example, these vibrating elements 4 can be arranged in the wristlet or in the contact face of this wristlet, in particular in at least one strand of this wristlet. It is noted in this example that the contact face of this wristlet is preferably deformable. In a third example, these vibrating elements 4 can be arranged in the contact face of the bottom of the watch case, this contact face preferably being deformable. In a fourth example, the touch-rendering interface 3 comprises a deformable support membrane in which the vibrating elements 4 are arranged. In this example, this membrane can thus be a part added onto the watch 1 by being fastened to the contact face of the bottom of the watch case and/or to the contact face of the wristlet. In one alternative, this membrane can be made in one piece with the contact face of the bottom of the watch case 1 and/or of the contact face of the wristlet.

It is noted that in this watch 1, each vibrating element 4 is distinctly linked/connected to the processing unit 2. Such a vibrating element 4 can for example be manufactured from a piezoelectric ceramic or from a flexible piezoelectric material (polyvinylidene fluoride—PVDF), and can have, in a non-limiting manner, a circular shape and/or be a film or a skin. Such a vibrating element 4 can have characteristic dimensions of approximately several square millimetres or even several square micrometres with a small thickness of approximately several millimetres or even several micrometres. In this configuration the processing unit 2 is capable of individually and/or distinctly controlling each vibrating element 4 of this touch-rendering interface 3.

In this watch 1, the communication module 8 is configured to establish a connection with a system of cellular networks by comprising namely a SIM card (acronym for "Subscriber Identity Module") or with a system of WLAN wireless local networks, and is also capable of implementing communication technologies for example such as Bluetooth. In these conditions, the watch 1 is capable of exchanging data with a remote server, a computer or even a smartphone.

Moreover, the environmental sensors 9 of the watch 1, are specifically adapted for measuring environmental parameters for example such as the temperature, the atmospheric pressure, etc. With regard to the behavioural sensors 9, they are capable of measuring all types of behavioural characteristics of the wearer of the watch 1 for example such as the movements or the gestures carried out by the latter. To do this, these behavioural sensors 9 can comprise one or more inertial sensors of the accelerometer, gyroscope or miniature multiaxial gyrometer type such as multiaxial sensors manufactured using MEMS technology, capable of detecting angular speeds and linear accelerations according to a plurality of axes associating accelerometers and/or gyroscopes. With regard to the physiological sensors 9, they are capable of measuring the parameters relative to the functioning of an organism of the wearer such as, for example, the pulse, the saturation of the blood with oxygen, the impedance of the skin, the blood pressure, the respiratory rate, the respiratory arrhythmia, the skin temperature, the sweat rate, the saturation of the blood with oxygen or the blood flow.

Such a method comprises a step of reception 10 by the processing unit 2 of the watch 1 of data of information comprising the notification message relative to the identification of an event relating to a function of the watch. This watch indeed comprises a set of functions. These functions relate in a non-exhaustive and non-limiting manner to: the management of telephone calls, the management of short messages of the SMS or MMS type, the management of instant messages, the measurement of an atmospheric pressure, the measurement of an altitude, the measurement of a temperature, the providing of sports results, of navigation/guiding assistance, the measurement of heart rate, the measurement of number of steps, of calendar, of alarm etc.

In this context, the data of information comprises for example a set of descriptive characteristics relative to a notification message. This data of information relative to a notification message which results from the identification of an event relative to functions of the watch 1, is received by the processing unit 2 from the sensors 9 of the watch 1 or from remote servers. In this context, it is noted that the identification of an event by the processing unit 2, can correspond in a non-limiting and non-exhaustive manner to:
- the determination of the exceeding of a threshold by a measurement coming from one or more sensors 9 namely in the case of monitoring by this processing unit of a behavioural or physiological parameter of the wearer or of an environmental parameter, etc.;
- the reception of a missed telephone call received by the processing unit 2 from the communication module 7;

the reception of a short or instant message or of a piece of mail that is electronic and received by the processing unit 2 from remote servers via the communication module;

the activation of an operating mode of the watch 1;

a triggering of an alarm such as: an alarm for the alarm clock, alarm for a meeting, alarm for taking a drug; etc.

In these conditions, data of information comprises a set of descriptive characteristics relative to a notification message, this set comprising for example:

a category of the identified event, for example: alarm for the alarm clock, alarm for a meeting, alarm for taking a drug, missed call, new measurement of a behavioural or physiological parameter of the wearer or of an environmental parameter, etc.;

time/date of the identified event, for example: time of the missed call, time of the measurement, etc.

In addition, it is noted that when the notification message relates for example to a missed telephone call or to the reception of a new short or instant message or of a new email, these characteristics can further comprise:

contact elements of the sender/the caller, for example: last name, first name, etc.;

the profile of the sender/the caller, for example: family member, close friend, work colleague, client, boyfriend/girlfriend, spouse, etc.

The method then involves a step of processing 11 of the data of information comprising the notification message relative to the identification of an event relating to a function of the watch. This step 11 comprises a substep of extraction 12 of at least one descriptive characteristic of said data, the substep 12 involving a phase of selection 13 of at least one descriptive characteristic in the data of information according to an extraction criterion. This extraction criterion is previously defined by the wearer of the watch 1 and comprises namely the number and the type of descriptive characteristic to be selected. Such a criterion thus allows to identify at least one characteristic to be selected out of the plurality of characteristics comprised in this data of information. For example, if the set of descriptive characteristics relates to a notification message relating to an identified event relating to a missed telephone call from the spouse of the wearer, and the extraction criterion involves the selection of two characteristics, the first of which must relate to the category of the identified event and the second to the profile of the caller, then the characteristics extracted correspond for the first characteristic to "a telephone call" and for the second to "the spouse".

Such an extraction criterion allows to define the descriptive characteristics which participate in the design of the descriptive alert to be broadcast to the wearer.

The method then comprises a step of sending 14 of a descriptive-alert signal relative to said data of information received, to the touch-rendering interface 3 of the watch 1, said interface 3 being configured to transmit said alert to the wearer of the watch 1. This step 14 comprises a substep of selection 15 of a criterion of design of the alert signal on the basis of said at least one descriptive characteristic extracted from the data of information. This design criterion is defined according to one or more descriptive characteristics that are capable of being extracted from the data of information. This design criterion is preferably previously configured by the wearer of the watch like other design criteria archived in the memory elements of the processing unit 2. Such a design criterion comprises a scenario of operation of the vibrating elements forming the touch-rendering interface 3. This design criterion thus participates in the design of the signal relating to the descriptive alert intended to be transmitted to the wearer of the watch 1. For example, if the first characteristic is "a telephone call" and the second "the spouse" of the wearer then the criterion for design of the signal comprises an operating scenario that aims to design a touch descriptive alert specifically defined for these characteristics and which informs the wearer of the watch 1 through touch. This touch alert can correspond for example to a sensation of a caress perceived by the wearer or in one alternative to the realisation of a symbol/pattern on the skin of the wearer such as the contour of the shape of a heart.

It is noted that when the message comprises a graphic representation such as an image of the emoticon type, the processing unit is capable of implementing a digital processing of this image in order to identify for example the main object of this image and define the essential shape thereof for a representation of this shape on the skin of the wearer.

The criterion for design of the descriptive-alert signal comprises data on operation of the touch-rendering interface 3. More precisely, this data on operation of the touch-rendering interface 3 comprises at least one frequency and at least one amplitude defined for each vibrating element 4 forming said interface 3. In particular, this operational data comprises:

the duration of broadcasting of the descriptive alert;

at least one time/period of operation of each vibrating element 4 with respect to the duration of broadcasting or:

a unique time of operation during all or a part of the duration of broadcasting of the descriptive alert, or a sequence of times of operation during the duration of broadcasting of the descriptive alert, and for each operating time:

a frequency of vibration and an amplitude of vibration, or a frequency of vibration and a sequence of amplitudes of vibration, or a sequence of frequencies of vibration and a sequence of amplitudes of vibration, or a sequence of frequencies of vibration and an amplitude of vibration.

It is noted that the sequence of frequencies of vibration can comprise only similar or substantially similar frequencies, or only different or substantially different frequencies, or a combination of similar and different frequencies. Likewise, the sequence of amplitudes can comprise only similar or substantially similar amplitudes, or only different or substantially different amplitudes, or a combination of similar and different amplitudes.

This step 14 then comprises a substep of generation 16 of the alert signal on the basis of said design criterion. During this substep 16, the processing unit 2 designs on the basis of this design criterion, the signal which allows to individually and/or distinctly control each vibrating element 4 of this touch-rendering interface 3. This signal is then sent by the processing unit to the touch-rendering interface 3 during a substep of transmission 17 of the signal. Such a signal comprises distinct control instructions of each vibrating element 4 during the duration of the broadcasting of the descriptive alert.

Upon reception of this signal, the touch-rendering interface 3 emits/broadcasts this touch descriptive alert onto the skin of the wearer. Thus, this touch alert can correspond in a non-limiting and non-exhaustive manner to:

the realisation of a contour of a graphic representation such as a pattern/symbol, a letter, a number in a touch-based manner that is to say as can be realised by the movement of the tip of a finger of an individual on the skin of the wearer;

the application of the graphic representation onto the skin of the wearer for example the application of the shape of a letter or of a symbol/pattern;

the generation of a wave and/or vibrating phenomenon aiming for example to create for the wearer a soft, pleasant, sensual or on the contrary unpleasant perception.

The invention also relates to a computer program comprising program code instructions for the execution of the steps 10 to 17 of this method when said computer program is executed by a processing unit 2 of the watch 1.

The invention claimed is:

1. Method for broadcasting an alert descriptive of a notification message to a wearer of a watch (1), the method comprising the following steps:

reception (10) by a processing unit (2) of the watch (1) of data of information comprising a notification message relative to the identification of an event relating to a function of the watch (1), and sending (14) of a descriptive-alert signal relative to said received data of information to a touch-rendering interface (3) of the watch (1), said interface (3) being configured to transmit said descriptive alert to the wearer of the watch (1).

2. Method according to claim 1, wherein it comprises a step of processing (11) of said data of information comprising a substep of extraction (12) of at least one descriptive characteristic of said data.

3. Method according to claim 1, wherein the substep of extraction (12) comprises a phase of selection (13) of at least one descriptive characteristic in the data of information according to an extraction criterion.

4. Method according to claim 1, wherein the extraction criterion is previously defined by the wearer of the watch and comprises namely the number and said at least one descriptive characteristic to be selected.

5. Method according to claim 1, wherein the step of sending (14) comprises a substep of selection (15) of a criterion of design of the signal on the basis of said at least one descriptive characteristic extracted from the data of information.

6. Method according to claim 1, wherein the design criterion comprises data on operation of the touch-rendering interface (3) comprising at least one frequency and at least one amplitude defined for each vibrating element (4) forming said interface (3).

7. Method according to claim 1, wherein the data of information comprises a set of descriptive characteristics relative to the notification message.

8. Method according to claim 1, wherein the signal comprises distinct control instructions of each vibrating element (4) of the touch-rendering interface (3) during the duration of broadcasting of the message.

9. Watch (1) that is in particular smart, implementing the method according to claim 1, comprising a processing unit (2) and a touch-rendering interface (3) provided with a plurality of vibrating elements (4), said processing unit (2) being connected to said touch-rendering interface (3).

10. Watch (1) according to claim 1, wherein the touch-rendering interface (3) is defined in all or just a portion of a part of the watch (1), said part being intended to be in contact with the skin of the wearer.

11. Computer program comprising program code instructions for the execution of the steps (10 to 17) of the method according to claim 1 when said computer program is executed by a processing unit (2) of a watch (1).

* * * * *